United States Patent [19]

Macia et al.

[11] Patent Number: 5,490,924
[45] Date of Patent: Feb. 13, 1996

[54] FILTRATION SYSTEM

[75] Inventors: Narciso F. Macia; Richard A. Pyde, both of Tempe, Ariz.

[73] Assignee: Control Systems Innovations, Inc., Tempe, Ariz.

[21] Appl. No.: 277,619

[22] Filed: Jul. 20, 1994

[51] Int. Cl.⁶ .................................................. B01D 29/68
[52] U.S. Cl. ................ 210/257.1; 210/411; 210/497.01; 210/512.1
[58] Field of Search ................................. 210/196, 257.1, 210/258, 411, 416.1, 456, 483, 485, 497.01, 512.1

[56] References Cited

U.S. PATENT DOCUMENTS

| | | | |
|---|---|---|---|
| 1,001,929 | 8/1911 | Collins | 210/411 |
| 3,530,993 | 9/1970 | Fulton | 210/411 |
| 4,113,618 | 9/1978 | Koseki et al. | 210/411 |
| 4,284,500 | 8/1981 | Keck | 210/497.01 |
| 4,297,209 | 10/1981 | DeVisser et al. | 210/411 |

*Primary Examiner*—Christopher Upton
*Attorney, Agent, or Firm*—Richard R. Mybeck; Peter B. Scull

[57] ABSTRACT

A filtration system for cleaning contaminated fluids having input means disposed tangentially of a cylindrical filter surface and simultaneously sweeping said surface and providing a fluid flow therethrough and backwash means having one or more nozzle bearing standpipes adapted to simultaneously rotate within and axially reciprocate spray nozzles relative to a cylindrical filter assembly to dislodge particulates therefrom either concurrently or independently of the flow of contaminated fluid therethrough.

9 Claims, 5 Drawing Sheets

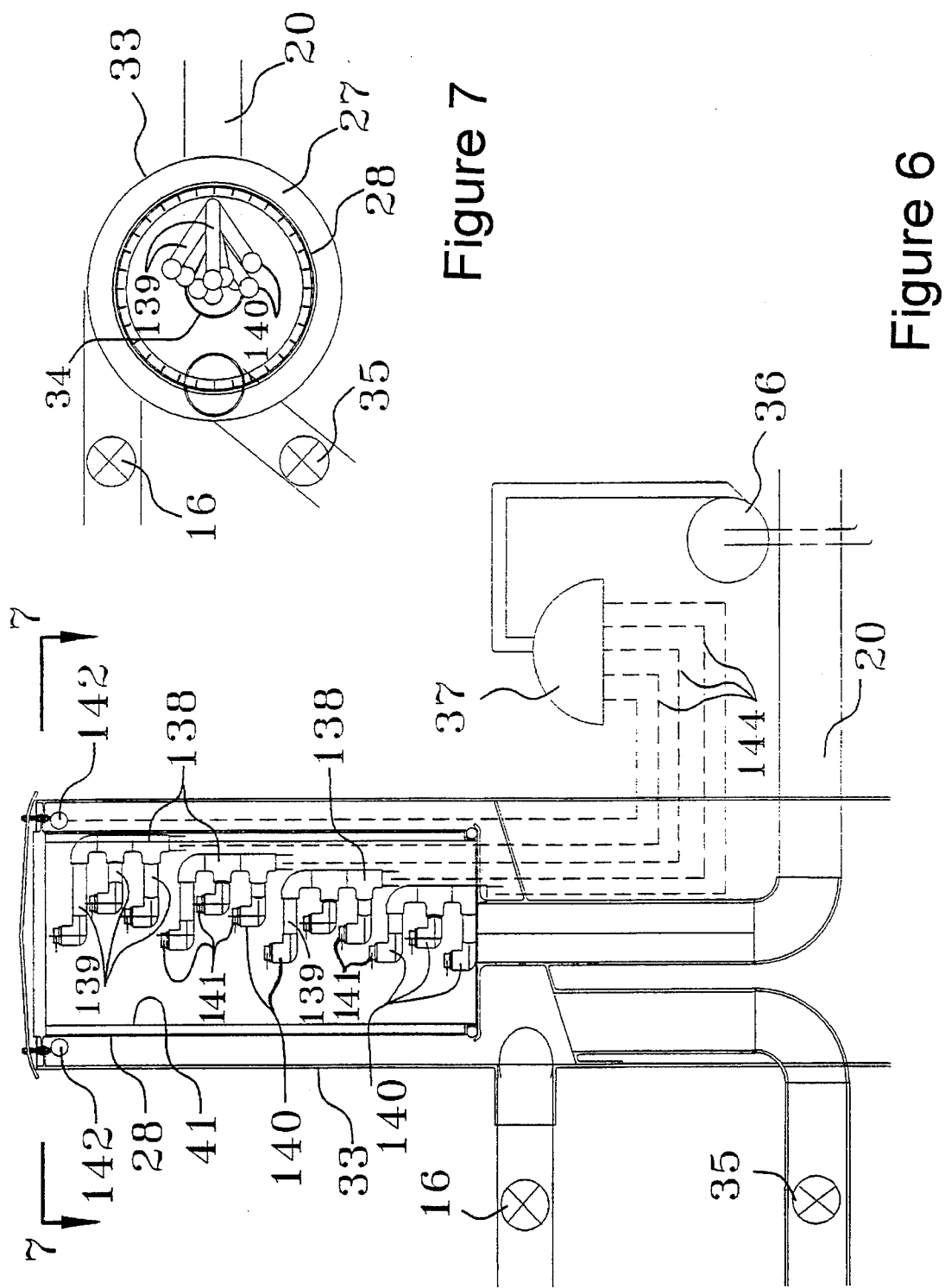

FILTRATION SYSTEM

The present invention relates generally to in situ filtration of untreated water for industrial and domestic use and more particularly to a novel filtration system which is especially useful for, but not limited to, water recharge.

BACKGROUND OF THE INVENTION

While not universal, many segments of the world's population suffer from the lack of an adequate water supply at some time during the year. When this occurs, crops fail for want of irrigation and major health problems arise, both from dehydration and from the compulsive, albeit imprudent, use of contaminated water supplies to satisfy human thirst.

Throughout history efforts have been directed to the creation of back-up or auxiliary water supply sources such as reservoirs or tanks, strategically placed dams in river beds, canals and the like. However, as is well known each has failed to totally resolve the problem and as a result, a need still exists for insightful means and methods to manage nature's water supply in such a way that mankind can have a ready source of usable water throughout the year regardless of general climate, terrain or the idiosyncrasies of local weather patterns.

One area which typifies those geographical areas which have heretofore been subject to great heat and highly cyclical and frequently unpredictable rainfall is the Sonora desert which extends from the Southwest United States into Northern Mexico and includes Phoenix, Arizona, the ninth largest city inn the U.S.

In the Phoenix Metropolitan area, the Salt River Project (SRP) is the largest raw water purveyor, founded basically to serve agricultural users and communities which do not have their own water supply. SRP delivers primarily through canals but, in addition, has approximately 250 wells to supplement its extensive surface water supply during dry periods and peak demand time. It is believed that these wells, which are located adjacent to SRP's canal conveyance system, could be further used for artificial ground water recharge if means could be developed to filter and treat the canal water to render it compatible with the wells and thereafter introduce that compatible water into the wells during idle ground water pumping periods.

A pilot project was commenced in 1991 to evaluate the feasibility of using the SRP wells for artificial ground water recharge in the alluvial aquifer of the Salt River Valley. A test injection station was established in a well site which was found to possess all the desirable characteristics, including a monitoring well. An innovative injection system was installed and evaluated. This system used a rotating microscreen for filtration, and chlorination of canal water prior to its injection into the well (Gorey et al. 1989, Lluria et al. 1991). Although this system proved to be effective in reducing particulates, it was incapable of providing an adequate flow rate, was costly to erect and operate, and required considerable maintenance. The drawbacks encountered in this approach motivated SRP to announce a need for alternative solutions to the problem. The filtration system of the present invention was devised in response to that announcement.

The use of idle production wells for ground water recharge is an attractive idea. However, such a well must be characterized by favorable geohydrology and ground water quality characteristics. Furthermore, the recharge water must be compatible with the well or else irreversible well damage may result. Three mechanisms exist that can plug and permanently damage a well: chemical, entrained air, and suspended particulates. Chemical plugging occurs when the water chemistry of the water used for recharge is significantly different than that of the water in the aquifer because it causes an ionic/chemical reaction to occur which closes up the pores of the well, and reduces its permeability. Air entrainment also adversely affects a well because air bubbles, driven by capillary action, become lodged in the formation and reduce its permeability. Indeed, the damage from air bubbles can be so extensive that well redevelopment, that is, pumping all water out of the well, may not be able to reverse the damage. Suspended particulate (organic and mineral) plugging is probably the major cause of reduction of recharge rates in injection wells because the clogging of the intergranular pores in medium and fine grained sediment aquifers substantially reduces their permeability. If the suspended solids concentration is large and the time of injection with this type of water is considerable, permanent damage to the well may also result. Well redevelopment, using pumping and surging, is the only method presently known which can improve well recharge performance. If the source for well recharge is untreated water, frequent redevelopment will be required at very short time intervals, elevating the cost of the recharge operation and reducing the long-term injection rate.

In dealing with canal water, mineral particulates did not present a problem. On the other hand, the canal water was rich in organics, primarily algae, and that presented a major challenge to the filtration system.

The desiderata leading to the present invention was the quest for a filtration system which has the ability to remove large particulates and organics, provide high flows, keep air from being entrained, and which would be relatively inexpensive to build and operate.

In our pursuit, it was learned that filters which work well in the water treatment business are not necessarily feasible for recharge. For instance, the centrifugal separator, an excellent means to remove sand and heavy particulates, could not be used for water recharge because the suspended particulates in canal water are primarily organic and have a density close to that of water. As a result, centrifugal forces cannot differentiate between the organic particulates and water.

Further, the cost of the filter must be relatively low since present economic incentives for recharge are modest. This also means that the cost to build and operate the system must be low, and to be cost-effective, the system must be able to produce large flows. It is toward accomplishment of these goals that the present invention is directed.

Of course, there are also many prior art patents which deal with fluid filtration systems and their associated backwash or filter cleaning mechanisms developed to attempt to improve filtering efficiency. Among such disclosures are Vandercook (U.S. Pat. No. 1,139,825) who discloses a filter system in which a rotating nozzle assembly is used to spray a solid-liquid mixture against a horizontal filter. This spraying action not only facilitates the filtration, but also helps to keep the filter free from excessive buildup of unfiltered solids. A backwash process is also disclosed in which either water or air is forced up through the filter from below and coacts with a stream of water or air from the rotating nozzle assembly to dislodge debris from the filter surface.

Morino (U.S. Pat. No. 2,851,164) discloses a swimming pool filter in which a filter element is suspended in concentrical relationship about a fixed spray head which consists of a vertical tube having a plurality of holes disposed therein. Whether filtering or backwashing, incoming water is flowed into and through the fixed spray head. A valve is provided to increase the flow pressure during backwashing to create a "jet" to clean the filter element.

Snyder (U.S. Pat. No. 3,193,103) discloses a submersible pond filter having a cylindrical metal mesh strainer which contains a cleaning mechanism comprising a plurality of flexible, elastomeric hoses disposed therewithin. Fluids such as water, air, or both are forced under pressure into the elastomeric hoses which causes them to whip and flail about and direct a stream of fluid against the inner surface of the filter to dislodge debris therefrom.

Everroad (U.S. Pat. No. 3,236,249) discloses a free-standing filter cleaning device for cleaning individual cylindrical filters which are imported into the cleaning device. The device also includes a rotatable spray head arrangement comprising a cylindrical inner spray standard having a plurality of spray heads formed thereon, and two outer spray pipes, each having a plurality of spray heads which face radially inwardly. The inner sprays deliver a cleaning fluid radially against the interior of the filter, while the outer sprays spray the exterior. The outer pipe spray heads are positioned at a slight lateral angle thereby causing the entire spray head arrangement to rotate about its cylindrical axis during the cleaning operation in response to the "jet propulsion" created thereby.

Knieriem (U.S. Pat. No. 3,337,052) teaches a filter apparatus comprising an outer housing having a detachable top, and an inner cartridge assembly having a sintered filter element as a substantial part of its side wall. Fluid to be filtered flows into the housing, through the filter element on entering the cartridge and then flows out of the housing. The filter element is a porous, electrically conductive, sintered material that has a substantial electrical resistance. To clean this filter of clogged debris, an electrical current is passed through the filter element to heat the filter and burn any material caught on the filter. Gas purge means are then provided to blow the resulting ash from the assembly.

MacFarlane (U.S. Pat. No. 4,759,846) discloses a rotatable filter drum with a permeable filter element. The fluid to be filtered is passed through the filter element to the interior of the filter drum from which the filtrate then exits. To backwash the filter element, a plurality of hollow backwash arms are disposed outside of and operably bear against the filter element to provide a backwash seal. The backwash arms are preferably positioned so that they will sweep the entire surface of the filter element during one full rotation of the filter drum.

In the use of this device, backwashing and filtering can occur simultaneously. As the filter drum rotates, most of the fluid flows through the filter and out the filtrate outlet. However, a small percentage of filtrate is simultaneously forced back through the filter element into the backwash arms. A lower pressure is preferably maintained in the backwash arms to suction the limited back flow into the arms. Contaminants are dislodged by the back flow and carried out through the backwash arms. Rotating spray arms that sweep the inside surface of a filter drum may also be used to help loosen the debris.

Wilkins, et al. (U.S. Pat. No. 4,822,486) teaches a cylindrical, rotatable self-cleaning strainer or filter having a fixed nozzle structure mounted within the filter. The nozzle structure is supplied with water from an independent source and the water is forcefully discharged against the filter to dislodge trapped debris from the outside of the filter.

As is readily apparent, none of the prior art teaches a filtration system which achieves all of the aforestated goals. It is toward the realization of those goals that the present invention is directed.

BRIEF SUMMARY OF THE INVENTION

The present invention relates to a novel and unique water recharge filtration system which is gravity fed and can operate with heads as low as the height of the filter. A novel filter comprising a synthetic filter fabric or screen mounted on the outside of a cylindrical, skeletal frame and fitted within a cylindrical tank comprises one salient element of the new system.

Still another important aspect of the present invention is the provision of an off-center tangentially disposed feed inlet which during the filtering mode, not only maintains a full charge to the filter but by its induced turbulence sweeps across the filter screen and dislodges accumulated particulates therefrom thereby enabling each filter cycle to be substantially extended and reduces the incidence of major independent backwashes. The vortical effect of the raw water inflow also settles out heavier particulates and keeps lighter contaminants afloat to delay their impingement on and in the filter screen.

Another important feature of the present invention is the provision of a backwash and filter cleaning system in which a plurality of strategically placed jet-stream nozzles are assembled on a shaft which simultaneously rotates about and reciprocates along the vertical axis of the shaft to provide full disgorgement of all particulates lodged within filter screen openings while, either independently backwashing or simultaneously cleaning some filter screen openings during continued filtering of the input fluid.

In practice, untreated raw water is fed tangentially to an annulus defined between the filter tank and the cylindrical filter frame from whence it is passed through the filter and is delivered into a storage tank, where, when desired, it can be disinfected by chlorination or by using other suitable chemicals and prepared for its ultimate consumptive use. The storage tank allows uninterrupted flow to the ultimate user, even while the filter unit is being independently backwashed. When a storage well is the immediate destination for the processed water, the storage tank also minimizes the possibility of air entrainment in that well because of its configuration such that the air bubbles float to the surface of the tank and dissipate. The filter screen is either simultaneously cleaned during filtering mode or independently backwashed by selectively directing filtered water from the storage tank through a plurality of rotating and reciprocating nozzles located in the center of the frame. The filter frame structures are preferably fiberglass. Tests have demonstrated peak flows in the preferred embodiment in excess of four $m^3$/min, with the average flow depending on the quantity of algae present and the frequency or duration of backwash.

Accordingly, a primary object of the present invention is to provide a novel and unique water filtration system which is capable of removing large particulates, provides high flow, avoids air entrainment, is self purging and which is relatively inexpensive to build and operate.

Another object of the present invention is to provide a novel and unique water filtration system which is especially useful in processing water for recharging domestic wells.

Still another object of the present invention is to provide a novel filter system having a unique backwash and filter cleaning system adapted to simultaneously vertically reciprocate while rotating to selectively dislodge particulates from ever-changing target areas of the screen.

Still a further object of the present invention is to provide a novel and unique filtration system having an off-center tangentially disposed inlet so positioned to enable the inlet flow to swirl and circulate around the filter frame to create a vortex which simultaneously settles out heavier particulates and sweeps debris from the filter screen.

These and still further objects as shall hereinafter appear are readily fulfilled by the present invention in a remarkably unexpected fashion as will be readily discerned from the following detailed description of an exemplary embodiment thereof especially when read in conjunction with the accompanying drawings in which like parts bear like numerals throughout the several views.

BRIEF DESCRIPTION OF THE DRAWINGS

In the drawings:

FIG. 6 is a cross section of another backwash mechanism embodying the present invention; and FIG. 7 is a cross section taken on line 7—7 of FIG. 6.

DESCRIPTION OF THE PREFERRED EMBODIMENT

Figure 1:
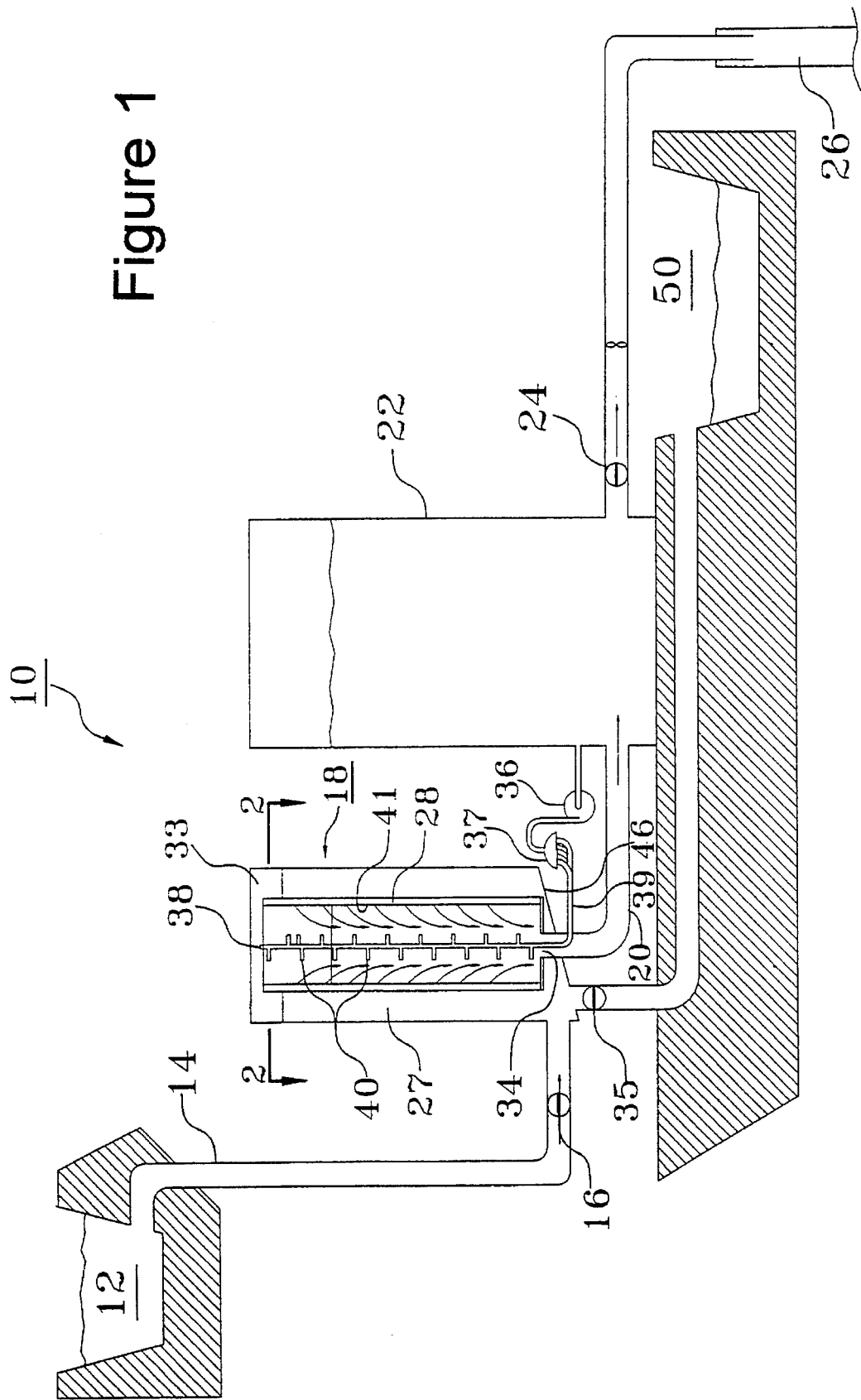
FIG. 1 is a schematic view of a fluid filtration system embodying the present invention.

The present invention relates to a novel filtration system which, as shown in FIG. 1, is identified by the general reference 10. The system, denominated "Cylindrical Filter System" or "CFS" has been developed especially for recharge applications but is not so limited in its use. For illustrative purposes only, the present invention will be described in a setting with a rechargeable well.

As shown in FIG. 1, unfiltered or raw fluid such as water is taken from a raw water source such as canal 12 and suitably transported, either by gravity feed or pump activation through inlet conduit 14 and inlet valve 16 into filter assembly 18 which removes foreign particulates from the fluid. From filter assembly 18, the filtered or clean fluid is passed through outlet conduit 20 into storage tank 22 (where chlorination may take place as desired) from which, inter alia, it can be withdrawn through storage tank valve 24 and directed to the ultimate destination such as adjacent recharge well 26.

Figure 2:
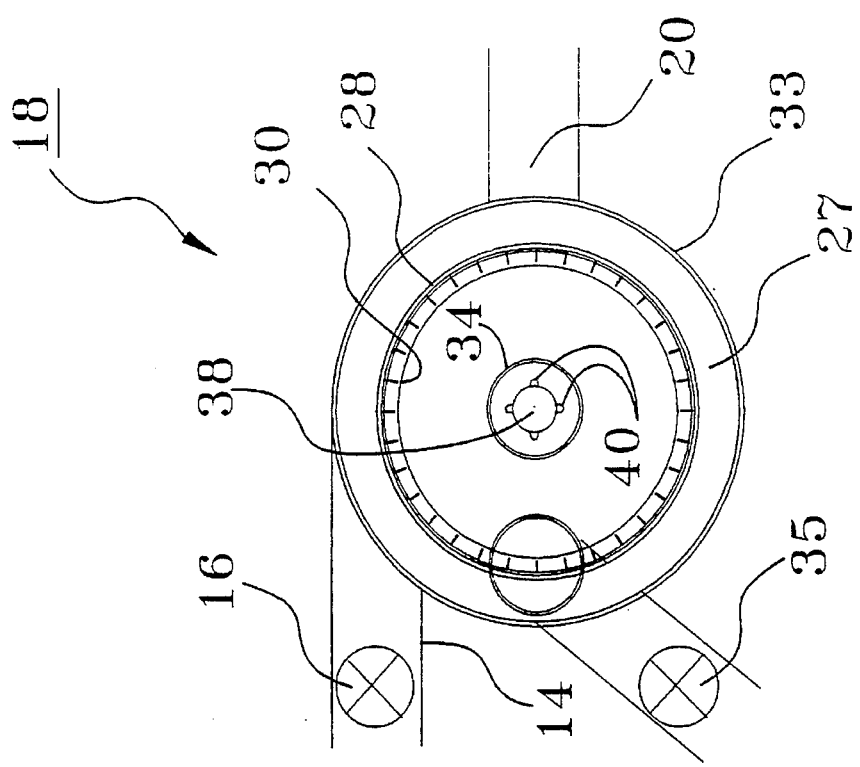
FIG. 2 is a cross-section view taken on line 2—2 of FIG. 1.

System 10 is especially designed for, but is not limited to water recharge installations. When thus used, however, the contaminated fluid, that is canal water, is fed from its source 12 through inlet valve 16 into annulus 27 substantially tangentially to filter screen 28 as shown in FIG. 2. Annulus 27 is the open space disposed around cylindrical filter screen 28 Which is itself mounted on the perimeter of generally cylindrical skeletal filter frame 30 (which is preferably 1.52 m high and 0.81 m in diameter). Frame 30 and screen 28 as thus attached are centrally and preferably coaxially mounted within cylindrical tank 33 (preferably 0.91 m in diameter).

Figure 3:
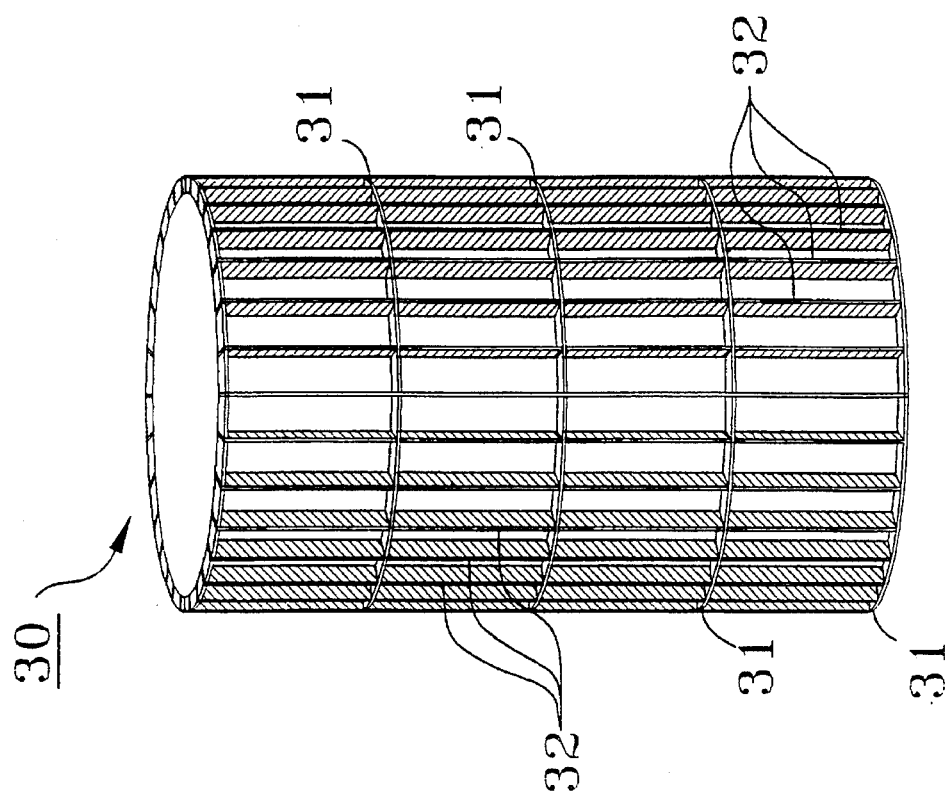
FIG. 3 is an isometric view of a filter frame in accordance with the present invention.

As shown in FIG. 3, skeletal frame 30 comprises a plurality of annular rings 31 disposed in vertically spaced generally parallel relationship to each other and interconnected by a plurality of spaced vertically extending generally parallel slat members 32. As constructed, the frame 30 is circumscribed by a suitable filter fabric screen 28 to complete the filter assembly 18.

The fluid, once passed through filter screen 28 into the area within frame 30 exits through a bottom opening 34 of tank 33 into outlet conduit 20 and hence to storage tank 22. In operation, the hydrostatic head across the screen 28 forces the fluid through screen 28 while particulates are trapped in the screen mesh. FIG. 1 shows a schematic of the complete installation. Water is introduced tangentially as shown more particularly in FIG. 2, into cylindrical filter assembly 18 and produces a turbulent flow which swirls around, across and through screen 28. The sweeping action across the screen surface serves to remove some of the particulates previously deposited on the screen 28.

The level of fluid in annulus 27 circumscribing screen 28 is maintained by modulating inlet valve 16. Preferably, this level is maintained close to the top of the filter assembly 18 to maximize head and hence flow. The level of the water can be monitored by means of a see-through slit window (not shown) defined on the side of the filter tank 33. In the event that valve 16 is not closed fast enough during a rising head, unfiltered water overflows through eight 0.10 m diameter holes on top of the filter tank where it spills to the ground.

In another embodiment (not shown) a plurality of pressure or other water level sensors are used to activate automated inlet and backwash valves 16 and 35 to operate an independent backwash mode described below. Preferred locations for such sensors are in either the storage tank 22 or the filter tank 33 of preselected levels to sense either a specific low level in storage tank 22 or a predetermined excess level or head in filter tank 33.

Figure 4B:
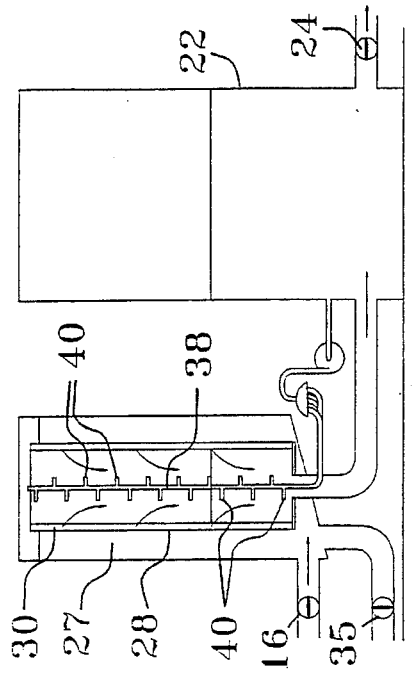
FIG. 4 is a series of schematics illustrating the backwash cycle of the system of FIG. 1.
Figure 4D:
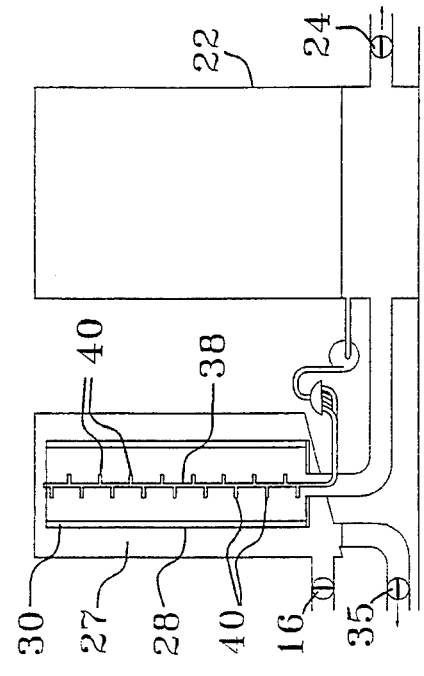
Figure 4A:
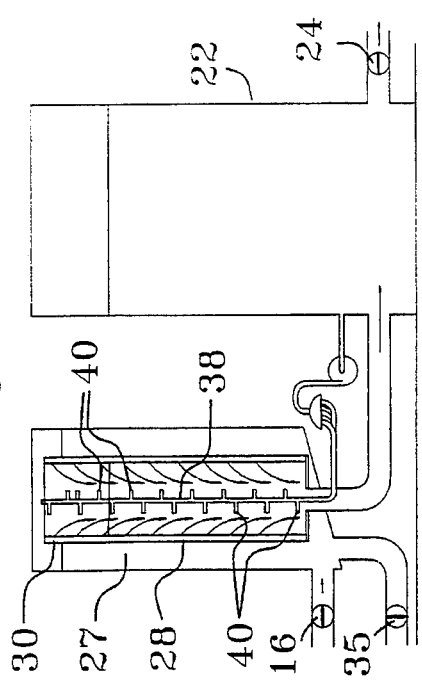
Figure 4C:
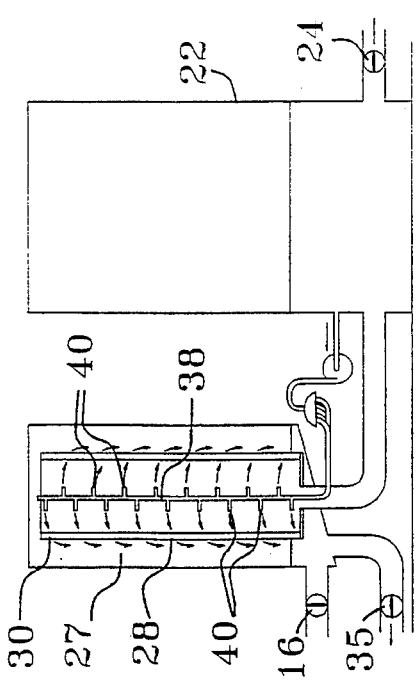

After a period of operation, which may include continuous backwashing during water inflow filtering, and depending on the turbidity of the water, enough particulate matter will attach to the filter screen 28 to plug screen 28 and essentially stop the flow of fluid through filter 28. When this occurs, the fluid level in tank 22 lowers an appreciable amount as the fluid flow through conduit 20 falls below a predetermined threshold, either of which indicates that filter 28 needs to be fully and independently backwashed. Independent backwash is accomplished by closing inlet valve 16, opening backwash valve 35, and activating a preferably two hp swimming pool type pump (1 hp=0.7457 Kw) 36. Pump 36 moves previously filtered water from storage tank 22 through a computer-controlled valve 37 which directs the flow sequentially to one or more standpipes 38 through a stationary supply pipe 39. This fluid then exits standpipes 38 through a series of nozzles 40 mounted thereupon which direct backwash water radially outward toward the inner surface 41 of filter screen 28, and thereby dislodge particulates lodged in the filter screen 28. FIGS. 4(a) through 4(d) show schematically the sequence of this backwash operation. In particular, FIG. 4a shows peak operation with inlet valve 16 open and backwash valve 35 closed. Also shown, are a high head in annulus 27 and optimum flow through screen 28 shown by the curved arrows. A corresponding high operating head is shown in storage tank 22. At some subsequent point in time, during which screen 28 has been clogged by particulates, FIG. 4b shows a reduced flow rate through screen 28 by the use of fewer curved arrows. As a result, the fluid levels inside both filter frame 30 and storage tank 22 begin to drop. Then, as is shown in FIG. 4c, by either manual or automated means, inlet valve 16 is closed, backwash valve 35 is opened, and clean fluid is sprayed from nozzles 40 in standpipe(s) 38 against screen 28 from the interior of filter frame 30 as shown by the arrows. Note also that filtered fluid continues to exit storage tank 22 through valve 24. FIG. 4d shows the completion state just before re-initiating the filtering mode shown in FIG. 4a. Finally, note that although this independent backwash procedure involves shutting down inlet valve 16 and opening backwash valve 35, the same process of running backwash sprays from the nozzles 40 of standpipe(s) 38 as shown in FIG. 4c, can also be used to simultaneously clean filter screen 28 during the filtering mode shown in FIG. 4a.

Furthermore, each time that particular nozzles 40 are activated by valve 37, standpipe(s) 38 rotate a partial revolution such as 1/18 of a revolution. Also because the independent backwash mode is initiated while the fluid level in the storage tank is sufficiently high, flow continues from storage tank 22 to its ultimate destination 26 throughout the backwash cycle. A flow meter 42 downstream of storage tank 22, measures the flow and can be automated using conventional technology, to prevent storage tank 22 from emptying prematurely. In practice, the jet sprays from nozzles 40 will cover the entire filter surface 41 in about two minutes.

Figure 5:
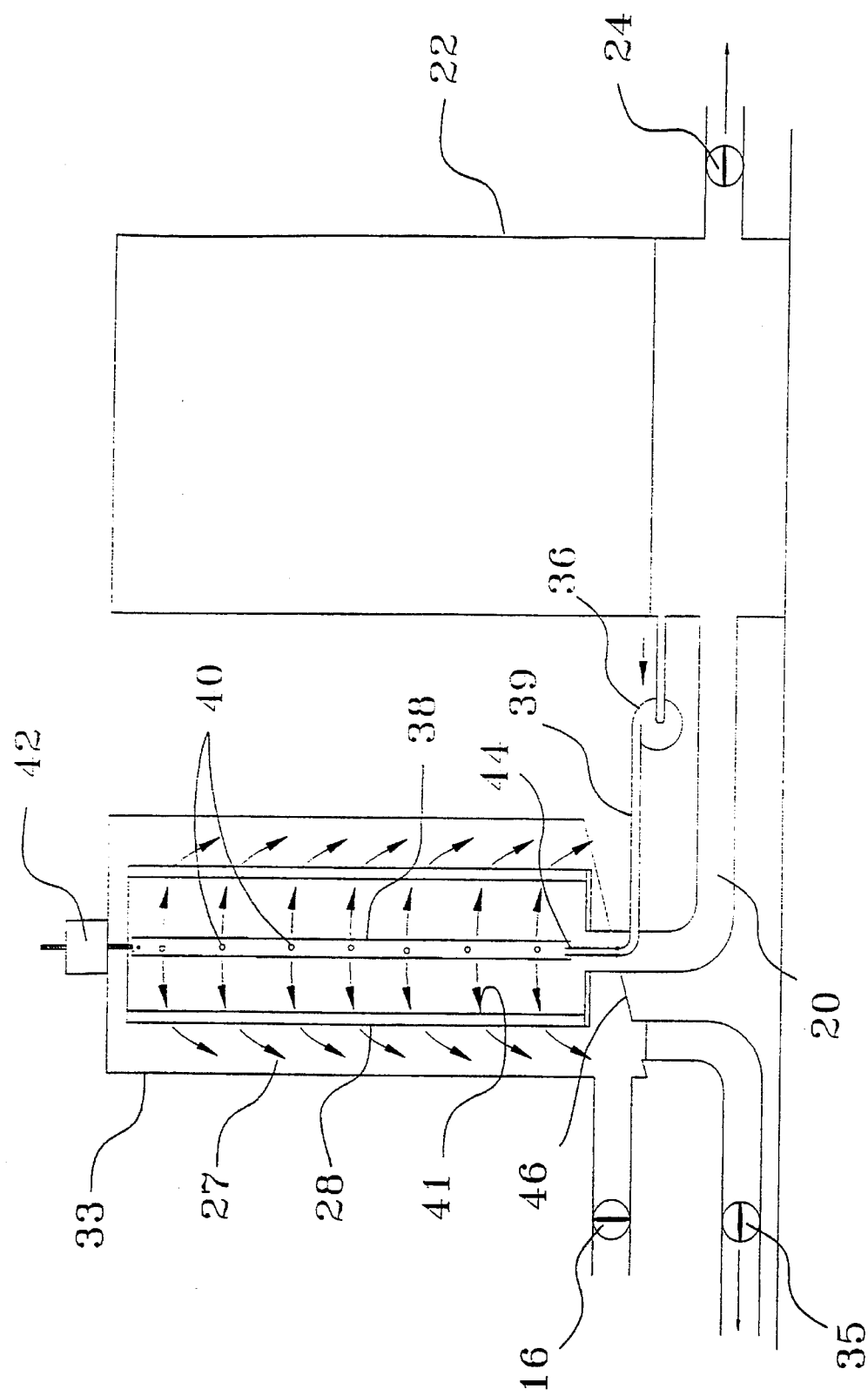
FIG. 5 is a cross-section of a backwash mechanism embodying the present invention.

Preferably, system 10 will embody the backwash arrangement illustrated in FIG. 5 which comprises a singular standpipe 38 and nozzle array 40, as previously described, but also in which standpipe 38 is simultaneously reciprocated along its longitudinal axis and rotated to spray the entire interior surface 41 of the filter screen 28. This movement is accomplished by pull/turn mechanism 42 which suspends standpipe 38 from the top of filter tank 33. The backwash fluid is fed to standpipe 38 as previously described through the bottom from a pump 36 through a stationary supply pipe 39. Note, a stronger pump 36 may be used to maintain a high pressure level within standpipe 38 and thereby eliminates the need for computer controlled valve 37. A lip seal 44 surrounds standpipe 38 without leakage.

In still another practice of the present invention, as shown in FIGS. 6 and 7, standpipe 38 is replaced by a plurality of standpipes 138 (usually four), each of which is independently fed by pump 36 through computer controlled valve 37 to assure each standpipe is equally pressurized. Each standpipe 138 has a plurality of lateral extensions 139 (usually three per standpipe) to each of which a retractable nozzle assembly 140 is attached. Assemblies 140 function in response to the water pressure generated by pump 36 to extend upwardly from lateral extensions 139 whereupon nozzle head 141 pops up and commences spraying the inner wall 41 of filter screen 28. Lateral extensions 139 are offset from each other at a plurality of lateral angles as is particularly shown in FIG. 7. These angles permit both the physical vertical orientation of nozzle assemblies 140 to be close together without pop up interference, and the ability to spray the full interior surface 41 of screen 28 including those areas hindered by stationary standpipes 138. Also shown in FIG. 6 is computer controlled valve 37 which intermittently supplies each of standpipes 138 with fluid as shown by dashed lines 141. One of such dashed lines 141 leads to an alternatively includable spray ring 142 circumscribing the top of screen 28 to spray down along screen 28 during the independent backwash modes. Computer controlled valve 37 is programmed using conventional technology to periodically interrupt the flow of water to each standpipe 138 and consequently each nozzle assembly 140 whereupon each nozzle head 141 retracts and in retracting rotates in its seat so that when the water pressure is resumed, the nozzle head pops up to produce a spray having an orientation different from that obtained previously.

During the backwash process, using either embodiment described, the particulates, once dislodged, will fall onto beveled tank floor 46 from whence they are transported through backwash valve 35 to an off-site grey water storage 50 designated for agricultural or golf course use.

While any of the conventional filter screen materials can be used in the practice of the present invention, the preferred filter screen will be formed of polypropylene monofilament fabric. Because of its durability and its high resistance to chemical attack, it is also very durable and is available in a variety of fabric constructions and pore sizes. Pore size is selected based on the size of the particulates in the raw fluid supply. Furthermore, the other components of the present invention are made from conventional materials using conventional assembly techniques. However, the preferred materials for filter assembly 28 include fiberglass frame members and PVC pipe for their lightweight durable properties.

The ultimate destination, represented in the preferred embodiment as recharge well 26 can alternatively be an industrial plant or, when health standards are met, a community water supply.

From the foregoing, it is readily apparent that a useful embodiment of the present invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly what is claimed is:

1. A novel system for removing particulate matter from a contaminated fluid source, said system comprising:

a filter tank having an inlet and an outlet, said inlet adapted to receive a stream of contaminated fluid from the source and deliver said stream to said tank, said inlet being disposed substantially tangentially relative to said filter tank;

a cylindrically shaped filter frame operatively mounted within said tank and operatively interposed between said inlet and said outlet;

a mesh filter screen mounted to said filter frame and circumscribed thereabout to define a cylindrical filter assembly therewith, said filter assembly coacting with said filter tank to define an annulus about said filter frame, said annulus coacting with said inlet to direct said stream of contaminated fluid tangentially of and through said filter screen;

a filter cleaning assembly for spraying cleaning fluid through said filter screen, said filter cleaning assembly having an upstanding central pipe disposed within said filter frame in coaxial relationship thereto, said pipe having a plurality of discrete nozzles mounted thereupon in axially spaced relationship to each other and at a plurality of radial angles such that said cleaning fluid may simultaneously be sprayed at a plurality of radial angles against said filter screens;

means for selectively reciprocating and rotating said pipe;

a storage tank operatively connected to said filter tank and adapted to receive and hold a flow of filtered fluid from said outlet;

pump means operatively interposed between said storage tank and said central pipe and selectively actuatable to deliver said cleaning fluid from said storage tank to said central pipe and through said nozzles into and through said filter screen.

2. A system according to claim 1 in which a second pump means is operatively interposed between said contaminated fluid source and said inlet and selectively actuatable to deliver contaminated fluid from said source to said inlet.

3. A system according to claim 1 in which said filter frame comprises a plurality of spaced generally parallel ring members disposed about a common central axis and a plurality of elongated slat members, each of said slat members being mounted to the perimeter of said rings in spaced generally parallel relationship to each other.

4. A novel system for removing particulate matter from a contaminated fluid source, said system comprising:

a filter tank having an inlet and an outlet, said inlet adapted to receive a stream of contaminated fluid from the source and deliver said stream to said tank, said inlet being disposed substantially tangentially relative to said filter tank;

a cylindrically shaped filter frame operatively mounted within said tank and operatively interposed between said inlet and said outlet;

a mesh filter screen mounted to said filter frame and circumscribed thereabout to define a cylindrical filter assembly therewith, said filter assembly coacting with said filter tank to define an annulus about said filter frame, said annulus coacting with said inlet to direct said stream of contaminated fluid tangentially of and through said filter screen;

a filter cleaning assembly for spraying cleaning fluid through said filter screen, said filter cleaning assembly having a plurality of upstanding standpipes disposed within said filter frame, said plurality of said standpipes having a plurality of discrete nozzles mounted thereupon in axially spaced relationship to each other and at a plurality of radial angles such that said cleaning fluid may simultaneously be sprayed at a plurality of radial angles against said filter screens;

means for selectively reciprocating and rotating said nozzles;

a storage tank operatively connected to said filter tank and adapted to receive and hold a flow of filtered fluid from said outlet;

pump means operatively interposed between said storage tank and said plurality of standpipes and selectively actuatable to deliver said cleaning fluid from said storage tank to said plurality of standpipes and through said nozzles into and through said filter screen.

5. A system according to claim 4 in which a second pump means is operatively interposed between said contaminated fluid source and said inlet and selectively actuatable to deliver contaminated fluid from said source to said inlet.

6. A system according to claim 4 in which said filter frame comprises a plurality of spaced generally parallel ring members disposed about a common central axis and a plurality of elongated slat members, each of said slat members being mounted to the perimeter of said rings in spaced generally parallel relationship to each other.

7. A filter system comprising:

an upright cylindrical filter tank means having an inlet means and a filtrate outlet means; a cylindrical filter means disposed in coaxial relationship within said filter tank means to separate said inlet means from said filtrate outlet means, said inlet means being disposed in substantially tangential relationship to said cylindrical filter means; and a backwash means, said backwash means having a nozzle-bearing standpipe disposed in upright relationship within said filter means and having a plurality of nozzles attached thereto, said nozzle-bearing standpipe being rotatable about its central longitudinal axis and reciprocable along said central longitudinal axis.

8. A filter system comprising:

an upright cylindrical filter tank means having an inlet means and a filtrate outlet means; a cylindrical filter means disposed in coaxial relationship within said filter tank means to separate said inlet means from said filtrate outlet means, said inlet means being disposed in substantially tangential relationship to said cylindrical filter means; and a backwash means, said backwash means having a plurality of upstanding standpipes disposed within said filter means, each of said standpipes having one or more lateral extensions in each of which is a nozzle assembly having a rotatable nozzle for spraying the interior of said cylindrical filter means.

9. A filter system according to claim 8 in which each said nozzle assembly comprises a pop-up rotatable nozzle for spraying the interior of said cylindrical filter means.

* * * * *